Dec. 23, 1941.  P. L. BETZ  2,267,347
VALVE
Filed Oct. 14, 1938
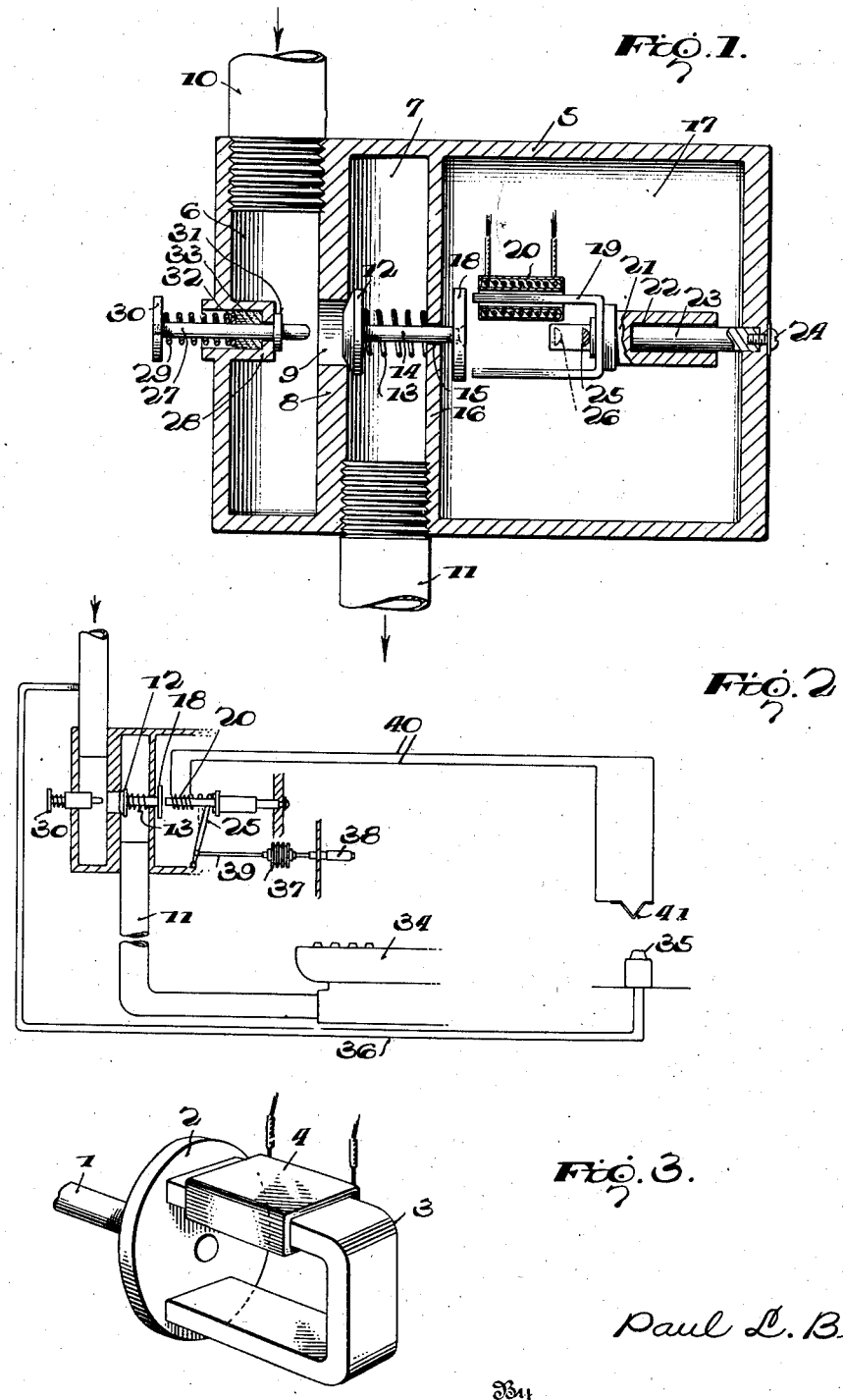
Inventor
Paul L. Betz.
By Cameron, Kerkam & Sutton
Attorneys Patented Dec. 23, 1941

2,267,347

UNITED STATES PATENT OFFICE 2,267,347

VALVE

Paul L. Betz, Baltimore, Md., assignor to Consolidated Gas Electric Light and Power Company of Baltimore, Baltimore, Md., a corporation of Maryland Application October 14, 1938, Serial No. 235,109

2 Claims. (Cl. 236—21)

This invention relates to valve mechanism for regulating the flow of a fluid in accordance with requirements and particularly to the provision of automatic means for rendering said control inoperative and maintaining the valve closed whenever some particular abnormal condition exists.

Many types of valve mechanism have been proposed heretofore for regulating the flow of a fluid in accordance with requirements, as for example the automatic regulation of the supply of a fuel such as gas in accordance with the need or demand for heat. In some cases it is desirable in the event of an abnormal condition to interrupt the normal operation of the valve, but in such a manner that normal operation can readily be reestablished at the proper time. It is also frequently the case in some systems that an abnormal condition may arise, such as the failure of a pilot, under which it is desirable for safety or other reasons to stop the flow of fluid completely until the abnormal condition is corrected. For the latter purpose it has been proposed to employ a second valve mechanism with a suitable automatic control such that the valve closes when such an abnormal condition exists and is then opened either automatically or manually after proper conditions have been reestablished.

It is an object of the present invention to provide novel valve-operating means whereby the normal operation of the valve in any desired manner may be interrupted and restored readily whenever required.

Another object of the invention is to provide novel means whereby the above functions of a regulatory valve and of a shut-off valve may be combined in a single valve.

Another object is to provide a single valve under dual automatic control such that said valve normally operates as a regulating valve but also operates as a shut-off valve under abnormal conditions.

A further object is to provide novel valve control mechanism wherein the normal automatically controlled valve-operating means are rendered inoperative by a second automatic control responsive to an abnormal condition.

Another object is to accomplish the above results by a simple, inexpensive mechanism having few parts but effective and reliable in operation.

Another object is to provide a novel mechanism comprising a core for holding an armature by magnetic attraction, said core being freely movable within a stationary electromagnet winding for the purpose of effecting an operation such as indicated above.

Other objects will appear hereinafter as the description proceeds.

One embodiment of the invention has been illustrated in the accompanying drawing but it is to be expressly understood that said drawing is for purposes of illustration only and is not to be taken as a definition of the limits of the invention, reference being had to the appended claims for this purpose.

In said drawing:

Fig. 1 is a sectional view of one form of valve mechanism embodying the invention;

Fig. 2 is a diagrammatic view illustrating a suitable way of using the apparatus shown in Fig. 1; and Fig. 3 is a perspective view showing a part of the mechanism of Fig. 1.

Broadly stated, valve mechanism embodying the invention comprises a single valve and suitable operating means therefor which are controlled in any suitable manner, usually automatically, so as to regulate the flow of fluid past the valve. Said operating means comprises elements which are normally connected so as to cause the desired regulatory movement of the valve, but in order that said valve may also serve as a shut-off in the event of an abnormal condition, said elements are capable of separation in such a manner as to permit the valve to close independently of its normal control. Said separable elements are accordingly maintained normally in valve-operating connection or engagement by means which, in the event of an abnormal condition or conditions, cause or permit separation of said elements, whereupon the valve is adapted to close and act as a shut-off valve until said operating connection is reestablished either automatically or manually.

These broad aspects of the invention will be better understood by reference to Fig. 3 which shows by way of illustration one form of apparatus suitable to accomplish these results. In this figure the valve (not shown) is operated either directly or in any suitable manner by a rod 1 carrying an armature 2 which is normally attracted by and held in contact with the poles of a horseshoe magnet 3. So long as the armature 2 and magnet 3 remain in engagement, regulatory motion can be transmitted to the valve from any suitable control means. The magnet 3 is energized by a coil 4 which is stationarily mounted and as shown loosely surrounds one leg of the magnet, sufficient free space being provided to allow the magnet to move freely back and forth relative to the coil. If greater holding force is desired, two coils may be used, one surrounding each leg of the magnet. As long as the coil 4 remains energized, it will be seen that the rod 1, armature 2 and magnet 3 constitute in effect an integral operating connection for the valve. Should the coil 4 be deenergized, however, as in the event of some abnormal condition, the magnet 3 no longer attracts the armature 2 and the valve is therefore free to close in any suitable manner and independently of the normal regulatory control thereof, the magnet 3 continuing to move without affecting the armature. When the coil 4 is again energized, it is only necessary to bring the armature 2 in contact with the poles of the magnet whereupon the valve operating connection is reestablished.

Fig. 1 illustrates an embodiment of the invention in connection with controlling the flow of gas to a gas burner although it will be understood that the invention is not restricted to this particular embodiment or use. In Fig. 1, the valve casing 5 is provided with two compartments or chambers 6 and 7 separated by a partition 8 in which is an opening 9. Gas enters the compartment 6 through an inlet pipe 10, passes through the opening 9 into the compartment 7 and leaves the latter through an outlet pipe 11. The flow of gas is controlled by a valve 12 adapted to seat against the partition 8 and to close the opening 9. Preferably and as shown, the valve is biased or urged toward closed position in any suitable manner as by a spring 13 surrounding the valve stem 14. The movement of the valve may be guided in any suitable manner, as by passage of said valve stem through an opening 15 in a partition 16.

Said partition 16 forms a third compartment or chamber 17 in the valve casing which houses valve-operating means embodying the construction described above in connection with Fig. 3. A magnetic armature 18 is suitably mounted on the end of the valve stem 14, said armature preferably having a minimum lateral dimension equal to or greater than the distance between the pole pieces of the magnet, in order that the angular position of the armature will not affect its cooperation with the magnet, and preferably being circular in shape as shown in Fig. 3. Preferably said armature is suitably mounted on the valve stem in such a manner as to permit some freedom of inclination relative to the axis of the valve stem in order to insure that the armature will properly contact both poles of the magnet without the necessity for accurate alignment of the valve stem.

The magnet 19 is energized by a coil 20 loosely surrounding one leg of the magnet as above described, said coil preferably being stationarily mounted in the casing in any suitable manner and the magnet 19 being mounted for movement relative to the coil in any suitable manner. As here shown the magnet is suitably connected to a supporting and guiding member 21 having a recess 22 in which extends a post 23 that is secured to the casing in any suitable manner as by the screw 24. The recess 22 and post 23 may have any suitable cross sectional form to prevent twisting or turning of the magnet 19 while permitting longitudinal movement of said magnet which may be effected by any suitable means in accordance with requirements. As here shown the position of the magnet 19 is controlled by a finger 25 capable of movement between the full line position and the dotted line position 26.

With this construction it will be seen that when the coil 20 is energized and the armature 18 is in contact with the magnet 19, the finger 25 in its full line position will hold the magnet 19 and the valve 12 to the right to permit the flow of gas through the opening 9. It will be observed that in the extreme right-hand position of the magnet shown in Fig. 1, the poles project to the left beyond the coil 20 so that said coil at no time interferes with the engagement of the armature 18 with said magnet. When the finger 25 moves to the left toward its dotted line position, the valve 12, armature 18 and magnet 19 likewise move to the left under the influence of the spring 13. Accordingly the valve normally moves toward or away from closed position depending upon the movement of the finger 25 and the position of the valve can thus be automatically controlled to effect regulation of the amount of gas flowing through the valve casing.

Should coil 20 be deenergized, however, the armature 18 is no longer attracted by the magnet 19 so that the valve 12 is moved to and maintained in closed position by the spring 13 independently of the position of the magnet 19. In order to reestablish the normal operating connections for the valve 12 it is necessary to reenergize the coil 20 and also to bring the armature 18 and the poles of the magnet 19 into contact. The latter can be effected by moving one of said elements into engagement with the other either automatically or manually as may be desired. In Fig. 1 manual means are shown for this purpose, said means comprising a push rod 27 passing through a suitable stuffing box 28 in the valve casing and normally maintained in the outward position shown in Fig. 1 by a spring 29 engaging a push button 30 on the outer end of said rod. Outward movement of said rod is suitably limited as by engagement of a collar 31 on the rod with the inner end of the stuffing box and said collar 31 may comprise a valve member that cooperates with a seat surrounding push rod 27, so as to effect a gas-tight seal when in the position shown in Fig. 1. In the form shown, said spring 29 bears at its inner end against a washer 32 to compress the packing 33 in the stuffing box. The rod 27 engages and lifts the valve 12 from its seat, and said rod is capable of movement of sufficient extent to move the armature 18 into contact with the poles of the magnet 19 regardless of the position of the magnet.

Fig. 2 shows by way of example one manner of using the apparatus of Fig. 1 in a gas heating system. Gas leaving the valve casing by way of the outlet pipe 11 is supplied to a burner 34 provided with a continuously operating pilot flame 35 supplied by a pipe 36. The position of the valve 12 is controlled by any suitable thermostatic means in accordance with the demand for heat from the burner 34. As here shown diagrammatically, a thermostat of the graduating type is illustrated, but it should be understood that the present invention may be applied to any type of control device. In Fig. 2 finger 25 may be operated by a bellows thermostat 37 having a bulb 38 disposed in the medium to be heated and connected with the finger 25 by means of a connecting link 39. The coil 20 is connected by wires 40 with a thermocouple 41 arranged so as to be subject to the heat of the pilot flame 35. As long as the pilot flame is burning, the thermocouple 41 energizes the coil 20 so that the armature is attracted by the magnet and the position of said valve is regulated automatically by the thermostat 37. Should the pilot flame 35 go out for any reason, the thermocouple 41 will cool off and the coil 20 will be deenergized. Armature 18 will no longer be attracted by magnet 19 and the valve 12 will close under the influence of the spring 13. The valve will then act as a safety shut-off valve, preventing the flow of gas to the burner 34 regardless of the demand for heat from the burner. Normal automatic operation of the valve can only be reestablished by lighting the pilot 35 to energize the coil 20 and then by operating the push button 30 as above described.

It will be seen that the invention provides means whereby the normal valve operating connections may be interrupted at will or automatically as required, but yet may readily be reestablished and normal operation restored with facility.

In the embodiment more particularly described above, it will be observed that the single valve has the functions of both a regulating valve and a shut-off valve. Normally said valve is regulated automatically to control the flow of fuel in accordance with requirements, this regulation being effected through operating connections including separable elements which are normally maintained in operative connection or engagement. When an abnormal condition exists, however, said elements are caused or permitted to separate, thereby breaking the operating connections to the valve and causing or permitting the valve to close and operate as a safety shut-off independently of the normal automatic control. As long as the abnormal condition exists, the valve can not be operated through the normal automatic control, but as soon as the abnormal condition is corrected, the normal operating connections can readily be reestablished and the valve resumes its normal operation.

While only one embodiment of the invention has been described and illustrated in the drawing it is to be expressly understood that the invention is not limited to this embodiment or to the particular use thereof which has been described above for purposes of illustration. Changes may be made in the form, details of construction and arrangement of the parts, and other types of controls may be substituted for those illustrated and described, without departing from the spirit of the invention. Many other uses of apparatus embodying the invention will also readily occur to those skilled in the art, and reference is accordingly to be had to the appended claims for a definition of the limits of the invention.

What is claimed is:

1. In a combination thermostat and safety shut-off device for controlling a gas burner, a stationary electromagnet winding adapted to be energized by a thermocouple subjected to the heat of a gas flame, a valve for controlling the supply of fuel to the gas burner, means biasing said valve to closed position, a thermostat for controlling the position of said valve, and valve-operating connections interposed between said valve and thermostat, said connections comprising an electromagnet core freely movable relatively to said winding and an armature which is held in operative relationship with said core by magnetic attraction when said winding is energized, said armature and core being separated by said biasing means when said winding is deenergized to close said valve independently of the position of said thermostat.

2. In a combination thermostat and safety shut-off device for controlling a gas burner, a valve casing having a valve therein for controlling the supply of fuel to the gas burner, a valve stem and a magnetic armature carried thereby, an electromagnet core aligned with said valve stem and adapted to engage said armature, a stationary electromagnet winding adapted to be energized by a thermocouple subjected to the heat of a gas flame, said core being freely movable relatively to said winding, and said core and armature being held together by magnetic attraction and moving longitudinally with said valve as a unit when said winding is energized, a thermostat for moving said core and controlling the position of said unit, means moving said valve and armature to closed position independently of said core when said winding is deenergized, and manually operable means for opening said valve and moving said armature into engagement with said core.

PAUL L. BETZ.